INVENTORS:
ROLF-KARL DORN
WERNER WISFELD
ERICH HERRMANN
GÜNTER DERENK

By Bailey, Stephens and Huettig
Attorneys

United States Patent Office 2,963,431
Patented Dec. 6, 1960

2,963,431

PROCESS AND APPARATUS FOR TREATING LIQUIDS WITH ION EXCHANGE MATERIALS

Rolf Karl Dorn, Hamburg-Rahlstedt, Werner Wisfeld, Frankfurt am Main, Erich Herrmann, Heidelberg, and Günter Derenk, Frankfurt am Main-Buchschlag, Germany, assignors to Metallgesellschaft Aktiengesellschaft, Frankfurt am Main, Germany Filed June 20, 1955, Ser. No. 516,484

Claims priority, application Germany June 22, 1954

10 Claims. (Cl. 210—33)

This invention relates to a process and apparatus for treating liquids with ion exchange materials.

Ordinarily the treatment of a liquid with granular reactive solid materials, for example, for the purpose of softening, or partly or entirely removing salt from water by means of ion exchange material, was performed by arranging the solid material in layers and passing the liquid therethrough. Here, when the ability of the solid material to react, as compared to that of the liquid, drops below a usable value, the stream of liquid is interrupted, and the ion exchange material is reactivated by any suitable treatment, for example, by means of regenerating chemicals, so that it can be used again in the treatment of the liquids. The disadvantage of this method resides in that it cannot be carried out continuously, but only intermittently in a more or less periodical rhythm.

It is also known in the art to treat liquids continuously with ion exchange material, with both the liquid and the ion exchange material being concurrently passed through the apparatus. After the treatment, the ion exchange material is separated from the liquid by means of a centrifuge or any other mechanical device, and is then regenerated before it is again brought into reaction. The process is so conducted that the ion exchange material is regenerated after having passed once through the treatment chamber. There is the disadvantage in that the process is carried out with only a small concentration of ion exchange material in the liquid when the usual concentration of ions for the ion exchange is applicable. Thus, in such process a long reaction path and time must be used in order to reach the desired effect.

The object of this invention is to produce a process and apparatus by means of which an uninterrupted flow of liquid is brought into contact with an ion exchanger, while at the same time a portion of the ion exchanger is recycled through a regenerator so that an adequate concentration of ions is always present in the liquid.

The disadvantages of the prior processes are overcome by this invention by concurrently passing the liquids and the ion exchange material through a treatment chamber, the ion exchange material being applied in such quantity that it will not be exhausted after one passage. After separation of the ion exchange material from the liquid, the ion exchange material, or a large part of it, is again brought into reaction with the liquid without having been again regenerated. For example, the ion exchange material is supplied to the liquid to be treated, as through a sluice-like device or through an injector, so that the particles of the ion exchange material will individually be distributed within the liquid without forming a close layer therein. The velocity of the liquid is so selected that it flows upwardly and downwardly and repeatedly changes its direction of flow, and thus carries along the solid material particles. The reaction between the liquid and the ion exchange material can be improved by installing grids, screens, filter beds, guiding planes, or the like in the reaction chamber. These installations preferably are made of thin sheet metal, or wires, or wire fabrics or similar structures, so that they take up only a relatively small part of the volume of the chamber. Thus, the liquid and the ion exchange material is brought into an extensive contact, and because of the formation of eddies, the ion exchange material and the liquid remain in an intimate mixture. At the same time the liquid films on the ion exchange material are constantly replaced so that the ion exchanger itself is considerably accelerated. After the liquid and/or the ion exchange material, respectively, have reached the desired state of treatment, they are separated, for example, by leading the flowing mixture into a separator in which the linear upward flow velocity of the liquid is reduced by correspondingly increasing the cross section of the separator to such an extent that the solid material particles separate completely from the liquid because of their weight. The separated ion exchange material, the reaction capacity of which is not yet completely exhausted, will then partly or entirely be recycled to the treatment chamber so that there is a circulation of the solid material particles. Thus the reaction capacity of the ion exchange material is efficiently employed.

The recycled ion exchange material can be taken out of the circulation from time to time in order to regenerate it, or it can be replaced by a corresponding quantity of new ion exchange material. It is also possible either to continuously or periodically remove partial quantities of the circulating ion exchange material for the purpose of regenerating and returning the same partial quantity of regenerated ion exchange material into the cycle. In order to render the circulation of the ion exchange material through the treatment chamber independent from the supply of the untreated, and the removal of the treated, quantity of liquid, it is suitable, for purposes of maintaining the working conditions in accordance with the invention and recycling the necessary quantity of ion exchange material, to have sufficient quantities of liquid in circulation. The quantity of liquid to be treated, or the quantity of treated liquid, is supplied to or removed from the circulation at a suitable place.

The circulation can be effected and maintained, for example, by a mechanically driven pump, or any similar device connected to the apparatus. Again the circulation of the liquids to be treated and the ion exchange material suspended therein can be effected by means of gas or vapor-like media, as by air or water vapor, which is introduced at the lower end of that part of the treatment chamber from which the liquid and the ion exchange material flow upwardly. Thus the technical effect, which is known in the principle of the air-lift pump, is employed. The use of air or other gases or the like, moreover, has the advantage in that when the mixture of liquid and ion exchange material is passed through the apparatus, a reaction of the liquid and the gases or the like can be carried out; for example, carbonic acid can be removed from the water treated by cation exchange, or chemical changes, or changes in temperature; furthermore, oxidations, reductions, or the like, can be carried out.

The liquid to be treated is supplied to the treatment area, together with the gaseous medium, or at another suitable place. It is suitable to use the pressure energy, which is freed at the moment of entrance of the liquid into the treating cycle, for the acceleration of the velocity of the cycle. This can be done by introducing the liquid to be treated, for example, in the form of a directed jet or stream. It is also possible to force the liquid to be treated through a nozzle, so that the liquid when passing through the nozzle automatically carries along the air or the gas. At another place of the cycle, which preferably is shortly before the inlet of the liquid to be treated with respect to the direction of current, the treated liquid is withdrawn and then separated from the ion exchange material.

The size of the granules of the ion exchange material may vary considerably. The size depends upon the properties of the liquid to be treated, on its chemical composition, and on the concentration of the substances to be exchanged in the liquid. The optimum size of the granules can be determined for all purposes of treatment by means of tests. Generally speaking, the usual commercial particle size of 0.3 to 1.0 mm. has proven to be suitable. Preferably, the ion exchange material granules have a spherical shape. Thus, wear and tear of the ion exchange material is avoided.

In all these cases the process in accordance with the invention is carried out in an apparatus in which a cyclic or a circular motion of the liquid to be treated occurs, the ion exchange material being suspended in the liquid. This apparatus may comprise two vertical tubes arranged side by side, said tubes being connected with one another by horizontal tubes at the top and at the bottom. It is also possible to arrange concentrically one vertical tube within a second vertical tube so that at either end of the tubes both the liquid and the ion exchange material can pass from one tube into the other. In the tube in which the current is directed upwardly, air or another gas or the like is passed and finely divided at the bottom of the tube. The gas bubbles rise in the suspension and escape from the upper end of the tube. Thus, the average specific weight of the suspension of the liquid and ion exchange material in the tube wherein the gas flows is less than the average specific weight of the suspension in the other tube where no gases are flowing. Because of this difference between the average specific weights of the two respective liquid columns, the column being lighter in specific weight moves upwardly and the column being heavier in specific weight move downwardly so that a circulating current occurs. The velocity of the circular motion is adjustable by changing the quantity of gas supplied to the process per time unit.

The mixture of ion exchange material and liquid is passed through the treatment chamber at such velocities that a separation of the liquid from the ion exchange material cannot take place. The velocities normally are between 30 and 3,000 meters per hour and can easily be adapted to the properties of the liquid to be treated and the ion exchange material.

Preferably the velocity is above 100 meters per hour. For example, for the treatment of water it is 800 to 1500 meters per hour. The lower limit of the velocity of current is always given by the settling velocity of the ion exchange material.

The quantity of ion exchange material to be applied in any individual case can be small. For example, in the softening of water, for almost any cases it is sufficient to use less than 5 vol. percent of ion exchange material with reference to the liquid volume treated per hour. In many cases, from 2.0 to 0.5 vol. percention exchange material is sufficient.

The ratio of liquid to be treated and the ion exchange material suspended therein, preferably is kept as small as possible.

For example, in 10 volume parts of untreated liquid, at least one volume part of ion exchange material, particularly three or more volume parts of ion exchange material, is suspended. This means that a certain ion exchange material granule often repeatedly passes through the cycle before the possibility occurs that it is drawn off into the regeneration chamber.

Moreover, it is suitable in this method to cycle a relatively large quantity of liquid per time unit through any cross section of the treatment area, and with respect to that, to withdraw, and to supply only a relatively small quantity of liquid in the same time unit. Thus, surprisingly small dimensions of the treatment chamber are required. Even though the period of time during which the liquid remains in the treatment chamber does not change, the liquid is more completely treated. Moreover, the increased velocity of flow advantageously affects the ion exchange material process because of the increased velocity of diffusion due to the increased velocity of current.

The present method is also suitable for applying different ion exchange materials simultaneously to the treatment of liquids. Thus, water, for example, can be partly or entirely freed of salt by simultaneously applying hydrogen ions and hydroxyl ions to the water. In this case, the regeneration of the mixed and different ion exchange materials requires a particular type of regeneration for each of the ion exchange materials. This can be achieved by suitably dividing the mixture of ion exchange materials after it has been withdrawn from the reaction chamber. Then the two kinds of ion exchange materials are separately regenerated. Such a division of the mixture of different ion exchange material is particularly easy when the finely granulated different ion exchange materials are of different specific weight. Due to their different specific weights, they can be separated by a hydraulic separation. That type of separation, for example, applies to the separation of the mixture of hydrogen ions and OH ion exchangers, that mixture having been used in the process of the removal of salt from water. Each of the separately regenerated components of ion exchange material is mixed again with the other component before being supplied to the process, or the two components are mixed at the desired ratio at the moment of being supplied by suitable means to the cycle.

In many cases it is suitable to carry out the method in stages in accordance with the invention, a plurality of stages being connected either in series or in parallel. The mixed bed effect known in the ion exchange material process with stationary filter layers is obtained in such multi-stage apparatus by recycling part of the liquid cycling in one of the stages to a preceding stage. Under certain circumstances and in order to obtain a particular effect, it is useful to combine operative stages in accordance with the invention with known filters, for example, arranged in stationary layers.

The process is also particularly suitable for the setting of any desired ratios of the liquid with the ion exchange material, respectively, for example, of any remaining hardness, in water. Also the process very advantageously can be applied to any other ion exchange material process.

Figures 1 to 8 serve to further explain the invention, said figures diagrammatically showing various apparatuses for carrying out the process in accordance with the invention.

Figure 1:
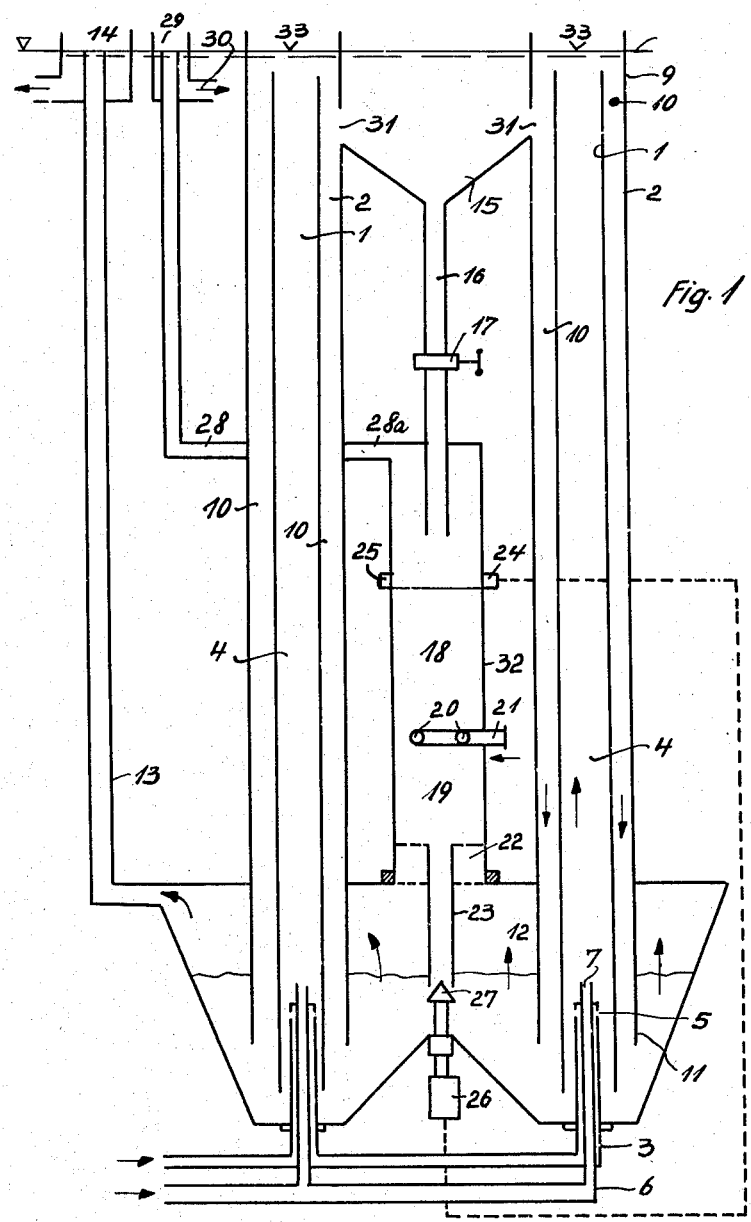
Figure 1 illustrates an apparatus for treating liquids with a type of ion exchange material in a plurality of parallel connected stages for the softening of water by cation exchange.

The apparatus illustrated in Figure 1 comprises any desired number of double tubes composed of an inner tube 1 and an outer tube 2. These tubes 1 and 2 are concentrically arranged with respect to one another and form the inner treatment chambers 4 and the outer treatment chambers 10. In each double tube, both tubes 1 and 2, respectively, are slightly longitudinally displaced with respect to one another. The upper end 9 of outer tube 2 extends beyond the end of inner tube 1, and above the liquid level 33 in the apparatus. At the lower portions of the tubes, the lower end 11 of the outer tube 2 terminates short above the lower end of inner tube 1. The upper ends of the double tubes are connected to separation chamber 15, and the lower ends to separation chamber 12. In these separation chambers the suspended ion exchange material separates from the liquid. The lower ends of the double tubes extend into separation chamber 12, to the bottom of which are connected ducts 6 for introducing the liquid to be treated and ducts 3 for the conveying media to each double tube. The ducts for the conveying media, for example, gas ducts 3, extend partly into the inner chamber 4 of each double tube and terminate with a gas distributing device 5, this being some nozzle system which brings about a fine and uniform distribution of the gases. The duct 6 for the liquid to be treated is either parallel to or concentrically arranged within the gas duct and enters into the inner chamber 4 in such a manner that its opening 7 extends beyond the gas distributing device. Opening 7 also can be formed like a nozzle in order to direct the liquid in the form of a jet which improves the upward flow of the ion exchange material and liquid. At the upper end of each double tube, the outlet of the inner tube is submerged. The gas escapes from the liquid at the upper end of the tube into the air, whereas the suspensions of ion exchange material and liquid partly flows downwardly into outer chamber 10 of the double tube, and partly through the outlet 31 into the upper separation chamber 15.

That part of the suspension which flows downwardly through the chamber 10 passes into lower separation chamber 12, in which the liquid separates from the suspended material. The treated liquid passes through ascending riser 13 into a level container 14 from which it is drawn off for further use. The cross section of flow of the separation chamber 12 is enlarged in the direction of the current, for example, from bottom to top, so that a sudden decrease of the velocity of current of the liquid is obtained. Thus, the treated liquid separates quickly from the ion exchange material, which at the bottom of the separation chamber 12 forms a fluid layer, wherefrom the suction at the lower end of the inner tubes 1 continuously takes along ion exchange material from the flowing in liquid. The portion of the suspended material, which from the upper end of the inner tube 1 has passed through the outlet 31 into separation chamber 15, is there separated into liquid and ion exchange material. The latter then forms a fluid layer on the conical bottom of that chamber 15, wherefrom ion exchange material, either continuously or intermittently in partial quantities, is passed into the chamber 32 arranged beneath the chamber 15. This chamber 32 is connected to chamber 15 through the connecting tube 16, which is provided with an adjustable orifice 17, or any other device for regulating the passage of the ion exchange material.

The regeneration, and the succeeding washing out of still adhering regeneration media, are carried out in chamber 32. This chamber 32 is arranged above lower separation chamber 12, and connected thereto through a layer 22 permeable to liquid, for example, a layer of coarse granulated material. At a considerable distance above that layer, somewhat in the lower third part or the middle of the height of the chamber 32, there is a lateral duct 21 for the introduction of regeneration media, from which chamber 32 is supplied with the media through a distributing device 20.

The connecting tube 23 passes from the bottom of chamber 32 through the layer 22 into the lower separation chamber 12 and reaches into the fluid layer formed by the ion exchange material. This tube is provided with a shut off valve 27 at its lower end, said valve being operated by a mechanism 26 and, if so desired, being controlled by regulating devices 24 and 25 according to the level of the ion exchange material in the chamber 32.

At the upper end of the chamber 32 there is a riser 28 being a discharge duct for the regeneration and rinsing liquid, said riser 28 extending to the level container 29, with the discharge duct 30.

The necessary quantity of ion exchange material is located in the lower separation chamber 12. The water to be treated is supplied to the apparatus through duct 6 and nozzle 7. As soon as the apparatus is filled up to the level at 33, the separation proper is started. Air from tubes 3 is introduced through gas distributor 5. Due to the decrease of the average density of the liquid within the inner chamber 4 of the double tubes with respect to the liquid in the outer chamber 10, a circulation of the liquid is effected, said circulation being directed upwardly in the inner chambers 4, and downwardly in the outer chambers 10. This circulation can be maintained by means of the air supply only, even when the supply of water is completely shut off. To the extent to which liquid to be treated is supplied to this cycle through ducts 6, treated liquid is drawn off from separation chamber 12.

The upward current in chamber 4 causes a suction at the lower end of tubes 1 so that ion exchange material from the fluid layer at the bottom of the separation chamber 12 is taken along by the liquid. This quantity of ion exchange material partly returns to separation chamber 12, in order to be recycled. The other portion passes to the upper collecting chamber 15, and from there into the regeneration.

The quantity of water which separates from the cycle through the double tubes flows through the lower separation chamber 12 and the riser 13 into the level container 14, wherefrom the treated water is drawn off. Part of the liquid collecting in separation chamber 12 percolates upwardly through the layer 22 which is permeable to liquid into the chamber 32, and washes the regenerated ion exchange material in the rinsing area 19 so that the ion exchange material thereafter is freed from regenerated media. From duct 21 and through distributor 20, concentrated media of regenerating liquid is supplied in adjustable quantities, and forms together with the upward flowing rinsing liquid the regeneration liquid which, after being used up, passes through the riser 28 into the level container 29, and flows off therefrom through duct 30. The quantity of ion exchange material separated from the top of the cycle collects at the bottom of the upper separation chamber 15, and is drawn off therefrom through the connecting tube 16 at a regulated rate into the chamber 32 where it forms, together with the upwardly and counter-currently flowing rinsing and regenerating liquid, a fluid layer.

The regenerated ion exchange material flows from the chamber 32 through the connecting tube 23 into the fluid layer at the bottom of the separation chamber 12. This transition is regulated by the shut-off valve 27 and controlled, for example, by the height of the ion exchange material in the chamber. This can be achieved by arranging at the wall of chamber 32 a source of light 25 and opposite to it a photo-electric cell 24. As long as the light beam from the light source 25 hits the photoelectric cell 24, through transparent fluid, the device is maintained in shut off position by the photo-electric current through a relay and the actuating mechanism 26. If the opaque ion exchange material filling within the chamber rises to intersect the light beam, shut-off valve 27 is opened and the regenerated ion exchange material flows off through tube 23 until the light beam is uncovered.

As explained above, the treatment of the water with the ion exchange material and the regeneration of the latter are separately regulatable processes. Depending upon the velocity in which the suspension of ion exchange material and liquid cycles, a treating cycle through the treatment chambers 4 and 10 is adjusted by the supply of air through duct 3 with consideration to the conveying effect of the water to be treated through duct 6. The regeneration of the charge of ion exchange material is separated from the treatment of the water. The velocity of throughput of the ion exchange material regeneration is regulated by the adjustment orifice 17 and the control shut-off valve 27. A throttling valve 28a in the duct 28 makes it possible to vary the quantity drawn off from the treated water which is necessary for the rinsing and regeneration.

The most simple embodiment of the apparatus in accordance with Figure 1 comprises only one double tube, an upper and a lower separation chamber being connected thereto. Other possibilities of the embodiment reside in that the water to be treated is supplied to the cycle, for example, at the upper end of the double tube or at any other suitable place.

Figure 2:
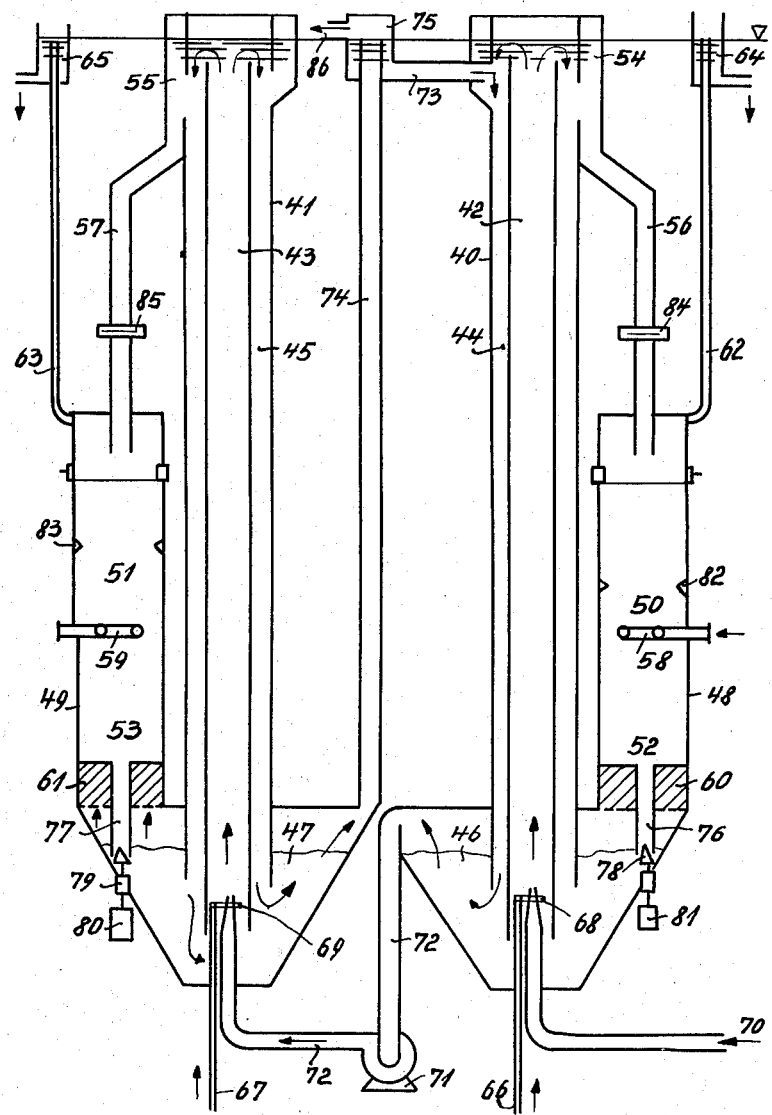
Figure 2 shows a two-step apparatus for the treatment of liquids with cation and anion exchangers for purposes of removing salt.

The apparatus, as shown in Figure 2, preferably serves for the double stage treatment of liquids with ion exchange material, for example, for partial or complete removal of salt from water by means of a cation exchanger and an anion exchanger in subsequent stages.

A treatment device is provided for each of those stages, said devices being arranged in a manner similar to that shown in Figure 1.

Double tubes 40 and 41 form the inner chambers 42 and 43 and the outer chambers 44 and 45. These double tubes extend into the lower collecting chambers 46 and 47 above which the regeneration chambers 48 and 49 are arranged. In these chambers are the regeneration areas 50 and 51, and the rinsing areas 52 and 53. The double tubes have overflow chambers 54 and 55 at their upper ends, from which the portions of ion exchange material which separate from the tube treatment of cycles flow through the connecting tubes 56 and 57 into the chambers 48 and 49, respectively. The regeneration media are supplied to the chambers 48 and 49 from ducts 58 and 59. Parts of the treated liquid are used in either stage as rinsing liquids, said treated liquid rising from the lower collecting chambers 46 and 47 through the liquid permeable layers 60 and 61 into the chambers, wherefrom they are drawn off through the risers 62 and 63 and the level containers 64 and 65.

The conveying gas, for example, air, is supplied to the inner chambers 42 and 43 of the double tubes through ducts 66 and 67, said ducts being provided with distributing devices 68 and 69.

The water to be freed of salt flows through duct 70 into the inner chamber 42 to the double tube 40, and is there treated with a cation exchanger which cycles through the two treatment chambers of the double tube 40, the cation exchanger lying at the bottom of the separation chamber 46 in the form of a fluid layer and being circulated therefrom.

The separation chamber 46 fills with liquid free of cations, of which a small part is passed through the regeneration chamber 48 in order to rinse through the regenerated ion exchanger, and then to dilute the regenerating media supplied to part 50 to a concentration suitable for the regeneration. The main part is passed through duct 72 into the inner treatment chamber 43 of the double tube 41 by means of pump 71, and then flows therefrom into the cycle of already treated liquid and anion exchangers.

A smaller part of the water freed of salt is drawn off from the separation chamber 47 to the chamber 49, where the regeneration of the anion exchangers takes place, and then through the riser 63 and the level container 65. The main part of the water freed of salt passes through riser 74 into the level container 75, and is withdrawn therefrom for further use through outlet 86.

From the bottom of the level container 75, a duct 73 extends to the upper overflow chamber 54 of the double tube 40; thus a cycle between the two exchange stages is obtained, a part of the quantity of the water freed of salt flowing through said cycle back into the cation exchange process.

The proportion between the two parts of liquids is determined by the capacity of pump 71, which supplies more liquid from the cation exchange stage to the anion exchange stage than is drawn off from the entire apparatus through the level container 75. A mixed bed results from this arrangement.

The ion exchange materials of each stage are separately regenerated, but principally in the same fashion as described with reference to the apparatus as shown in Figure 1. The connecting tubes 76 and 77, which extend from the chambers 48 and 49 into the separation chambers 46 and 47, are provided with shut-off valves 78 and 79, said valves being operated by means of driving mechanisms 80 and 81, and controlled by means of regulating elements 82 and 83. Preferably regulating devices 84 and 85 are arranged in the connecting tubes 56 and 57, by means of which the velocity of flow conveying the partially exhausted ion exchange material from the overflow and separating chambers 54 and 55 to the chambers 48 and 49, respectively, can be controlled.

Figure 3:
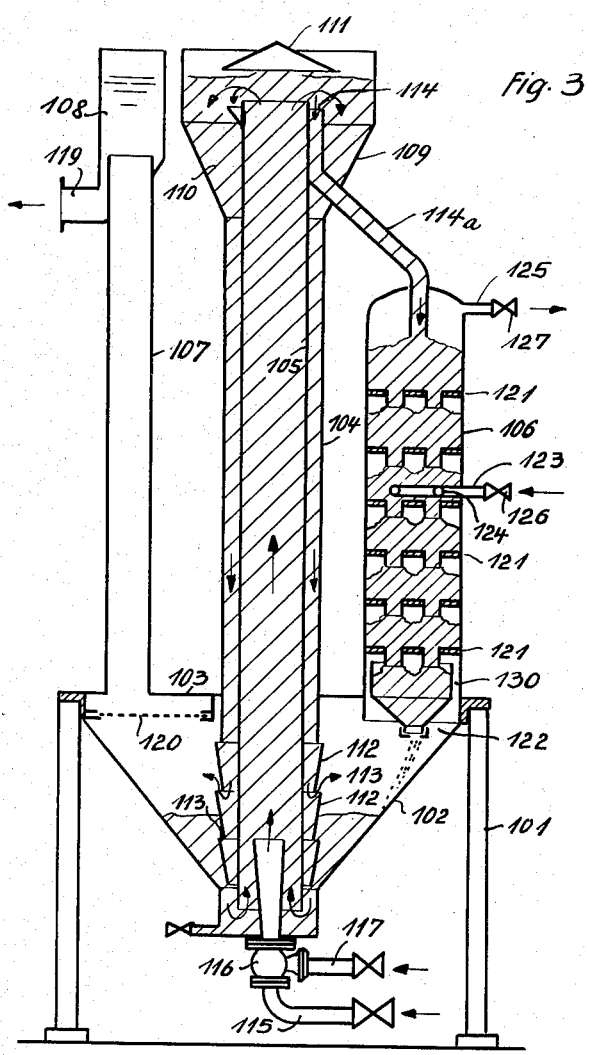
Figures 3 and 4 are one-stage apparatuses in a different form.

Figure 3 shows another embodiment of the apparatus in accordance with the invention, in which the gas necessary for the cycling of the liquid is drawn in through an injector by the stream of the incoming liquid.

On the support or frame 101, is a container 102, the cross section of which decreases downwardly. It may have the form of a frustro-cone or truncated pyramid, or it may be a trough whose vertical section is of trapezoidal shape, and it serves as the lower separation chamber. This container is sealed liquid-tight by means of a cover plate 103. On this cover plate the double tube, comprising the outer tube 104 and the inner tube 105, the regeneration device 106, and the standpipe 107 with the level container 108, are so arranged that they are connected with the separation chamber 102. In the upper end of the outer tube 104 of the double tube is a funnel-shaped enlarged portion 109, the inner tube 105 partly extending therein. Thus a separation chamber 110 is formed wherein the mixture flowing upwardly through the inner tube 105 is separated into liquid ion exchange material and conveying gas. The gas escapes upwardly into the air, whereas the ion exchange material sinks because of the reduced velocity of current.

A hood 111 diverts the upward flow into the upper separation chamber. The lower portion of the outer tube 104 of the double tube is composed of a plurality of conical tube elements 112 which are coaxially arranged with respect to the tube 104 in such a fashion that between their ends slits 113 are provided for the passage of liquid flowing downwardly in the annular chamber between the tubes 104 and 105. The ion exchange material grains carried along by the liquid remain within this annular chamber, and are recycled through the lower opening of the inner tube into the cycle, said opening being close to the bottom of the lower separation chamber 102.

Part of the ion exchange material sinking within the upper separation chamber 110 is constantly collected in a trough 114 surrounding the upper end of the inner tube, said trough having an inclined bottom. That part of the ion exchange material passes through tube 114a to the regeneration apparatus. A corresponding quantity of regenerated and rinsed ion exchange material is delivered from the regeneration apparatus to the lower separation chamber 102, in the lower part of which a stock of regenerated ion exchange material is stored. The quantity of ion exchange material cycling in the double tube is supplemented from this stock to the same extent as ion exchange material is supplied to the regeneration chamber 106 through duct 114, and the upward flow starting at the lower end of the inner tube 105 always carries along a uniform quantity of ion exchange material from the cylindrical bottom part of the lower separation chamber. This upward flow is generated according to the principle of an air-lift pump by means of air or any other suitable gas, said air or gas being drawn in through the injector 116 and the tube connection 117, and aspirated by the liquid to be treated coming in through tube 115.

The treated liquid is taken from the lower separation chamber through the standpipe 107 and through the pipe connection 119 which branches off from the level container 108. A sieve or the like 120 prevents whirled up particles of ion exchange material from passing into the outlet duct.

The regeneration apparatus 106 comprises a vertically extended, for example, cylindrical container, in which liquid permeable shelves 121 are arranged, layers of ion exchange material constantly forming on said shelves during the operation of the apparatus with regeneration liquid and/or a rinsing liquid, respectively, passing through said layers. Through downwardly directed tubes which are arranged in said shelves, the ion exchange material passes from each layer to the next lower layer and finally to the conical bottom of container 106 which is provided with an outlet 122 of variable cross section. At this place the rate of flow of the ion exchange material passing through the regeneration chamber is regulated. Somewhat in the middle of the height of the container, a supply duct 123 for the regeneration liquid is provided, said inlet duct 123 preferably communicating with the distributor 124 beneath a liquid permeable shelf.

At the upper end of the container 106 the weak regeneration liquid is drawn up and out through outlet 125. Both the inlet 123 and the outlet 125, provided for the regeneration liquid, are provided with regulating valves 126 and 127, respectively. Part of the liquid collecting in the lower separation chamber 102 is used as rinsing liquor for rinsing the regenerated ion exchange material.

Due to the pressure in standpipe 107 as determined by the height of the liquid therein, the treated liquid rises through the liquid permeable bottom of the regeneration apparatus, and first flows through the ion exchange material layers beneath the regeneration media inlet duct 124, then it mixes with the regeneration media supplied thereto as a concentrated solution, and forms with it the regeneration liquid.

The supply of the rinsing liquid into the regeneration apparatus may also be carried out as follows. The jacket of container 106 is tightly connected with cover plate 103, and a funnel-like collecting chamber 130 is formed for the rinsed ion exchange material, and is so attached to the lowermost shelf 121 that the liquid from the lower separation chamber flows upwardly into the regeneration apparatus by passing said shelf 121.

Figure 4:
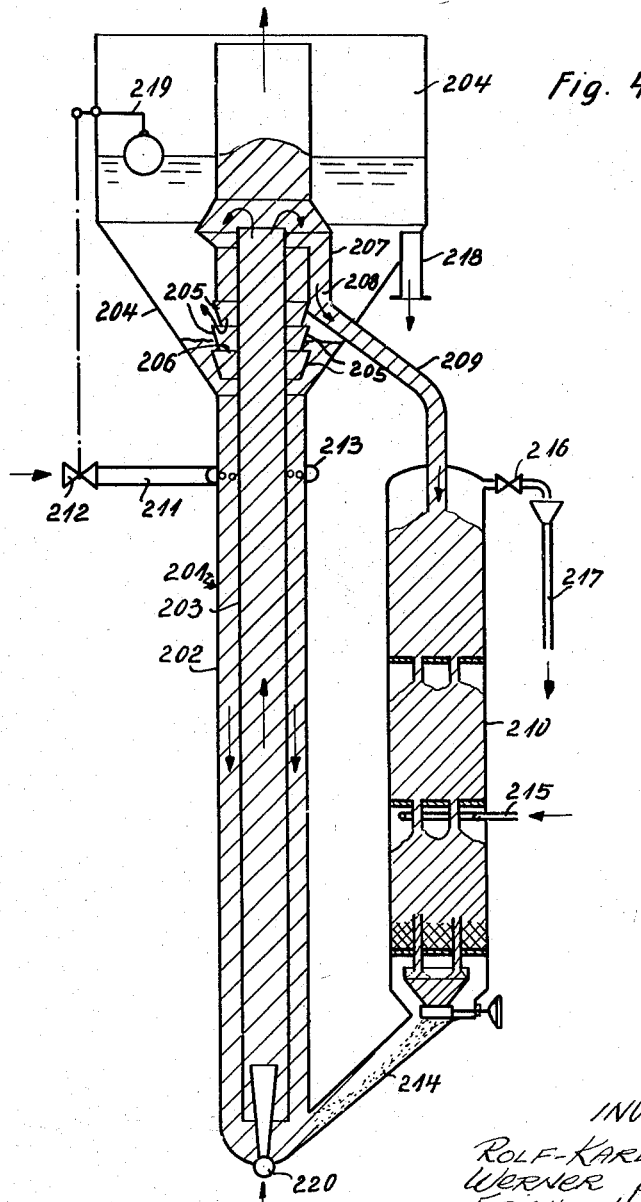

In the embodiment illustrated in Figure 4, the inlet ducts for the gaseous conveying medium and for the liquid to be treated are independent from one another. Thus, it is possible to influence within a wide range the through-put of liquid per time unit, independent of the velocity of circulation of the mixture of liquid and ion exchange material in the two chambers of the double tube.

The double tube 201 is formed by the outer tube 202 and the inner tube 203. A funnel-like enlarged portion, forming a collecting chamber 204 for receiving the treated liquid, is connected to the upper end of the outer tube 202. The inner tube protrudes into that collecting chamber. The conical tube pieces 205 are so concentrically arranged with respect to it that slots 206 for the passage of the liquid from the annular chamber of the double tube to the collecting chamber are formed. An attachment 207, being an extension of the outer tube, is arranged thereupon, said attachment acting as a separation chamber. The conveying gas escaping from the liquid flows therefrom into the air, whereas the flow of the mixture of liquid and ion exchange material changes its direction and flows downwardly into the annular chamber. Furthermore, a collecting trough 208 is mounted on the attachment 207 for receiving that part of the ion exchange material which is to be supplied to the regeneration. This trough is connected to tube 209, which in turn leads to the regeneration apparatus 210. This regeneration apparatus is constructed as illustrated in Figure 3, or in a somewhat similar manner.

The liquid to be treated is supplied to the annular chamber of the double tube through tube 211 which is provided with a regulating means 212. The part of tube 211 in the annular chamber is preferably provided with distributing devices 213 which preferably are arranged in the jacket of the outer tube. The gaseous conveying means is supplied into the lower end of the inner tube 203 by means of a nozzle 220, or by a similarly suitable distributing means.

The outer tube 202 of the double tube extends a little below the lower end of inner tube 203 and is closed in such a manner that a collecting chamber for a small stock of ion exchange material is obtained. This stock is fed by ion exchange material which sinks through the annular chamber in the double tube, or which returns from the regeneration into the cycle. From this stock the quantity of ion exchange material to be supplied to the cycle is carried along by the upward flow starting at the lower end of the inner tube. The regenerated ion exchange material returns to the cycle through tube 214, and also liquid flows countercurrent through tube 214 to the regeneration apparatus 210. That liquid flows as rinsing liquid through the exchange material layers located in the lower part of said regeneration apparatus 210, and then mixes with the concentrated solution of regeneration media supplied thereto from pipe 215. Spent regenerant flows out of the regeneration apparatus through the discharge duct 217 which is provided with an adjustable valve 216.

The treated liquid is withdrawn from the liquid collecting chamber 204 through a duct 218. The quantity of treated liquid withdrawn per time unit can be varied within large bounds and it can, for example, be as low as zero without affecting the circulating velocity of ion exchange material and liquid. For this purpose a regulating device is provided which comprises a float 219, the regulating valve 212 arranged in the supply duct for the liquid to be treated, and suitable transmitting means (not shown) which may be mechanically, pneumatically, or electrically operated.

This device maintains a constant and predetermined liquid level in the liquid collecting chamber 204, and it also continuously adjusts the supply of untreated liquids to the double tube according to the quantity of treated liquid withdrawn from outlet duct 218.

The concentric tubes which form the reaction chambers shown in Figures 1 to 4 can be provided in one of the passageways, preferably in the annular chamber formed by the two tubes, with deflecting elements for promoting the reaction of the liquid and the ion exchange material by increasing the transit-time, or the travel length of the materials. These elements should occupy less than 50 percent, preferably from 10 to 20 percent, of the volume of the annular chamber.

Such concentric tubes provided with deflecting elements are shown in vertical cross-sectional view in Figures 5 to 8. In each instance, A indicates the outer, and B the inner, tube.

Figure 5:
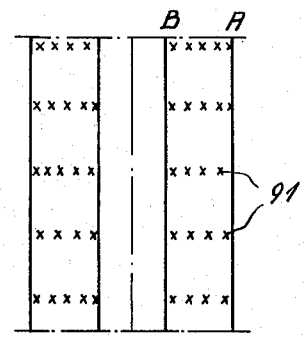
Figures 5 to 8 show various arrangements of deflecting elements in the concentric tubes in order to improve reaction conditions.

In the embodiment shown in Figure 5, the annular chamber between tubes A and B is subdivided by horizontal intermediate wire nettings 91, which are so spaced from each other, and have such meshes that the volume of the annular chamber is not substantially decreased.

Figure 6:
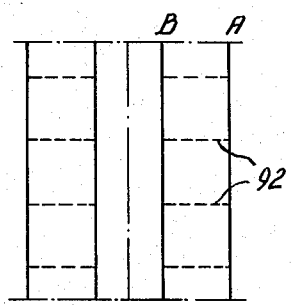

As shown in Figure 6, perforated plates 92 may be used in a similar manner. Elements of this type increase the transit-time of the ion exchange material as compared to that of the liquid, and in that way promote the interchanging action of the liquid and the solid material.

Figure 7:
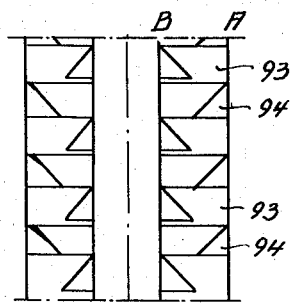

In the embodiment of Figure 7, the annular chamber between the tubes A and B is provided with inclined guiding surfaces 93 and 94, which preferably are provided with openings in order to prevent the formation of so called dead spaces which are not reached by the flow of material. These guiding surfaces extend over the entire circumference of the tubes and are in the shape of truncated cones whose lower diameter is larger than half the width of the annular chamber.

The guiding surfaces 93 of the inner tube B are staggered with respect to guiding surfaces 94 of the outer tube by half their vertical distance from one another so that the path of the mixing of liquid and ion exchange material is subject to lateral deviations repeated in these distances. In that way the transit-time is increased and a more efficient mixing of the ingredients of the reaction is obtained.

Figure 8:
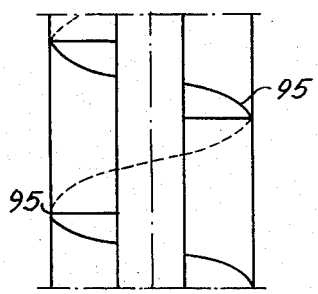

The element in the annular chamber as shown in Figure 8 provides for a helicoidal path of flow about the inner tube. The element 95 is a spiral of sheet metal, and may be composed of a plurality of parts. It is tightly attached to the walls. In this way the transit-time is, again, increased, which provides for a more efficient mixing of the liquid and solids.

Example I

A quantity of raw water of 17.5° German hardness is to be softened by means of a cation exchanger based on polystyrene, which only contains sulfonic acid groups as the active ion exchanger group. The quantity of water to be treated is 10 cb. m.

The softening area, in accordance with the invention, shows the following data. The diameter of the inner tube is 20 cm. and that of the outer tube is 30 cm., the length of the tube is about 3.5 m. During the softening process 150 liters of ion exchange material are present. The quantity of water which flows through a cross section of the treatment area amounts to about tenfold of the quantity of water which at the same time is supplied and withdrawn, respectively. The remaining hardness of the treated water is about 0.1 German hardness.

Example II

Water is treated in a two-stage apparatus for the removal of salt. The two stages are independent from one another, and one of them is operated with a cation exchanger based on polystyrene, the other stage being operated with an anion exchanger, the activeness of which is based on the presence of a quaternary ammonium base.

In both stages the water is treated in double tubes, the outer tube of which has a diameter of 200 mm. and that of the inner tube being 140 mm. The effective length of the tubes is about 4 m. The circulation of the liquid and of the ion exchange material in the double tubes is supported in both stages by blowing air into the lower ends of the double tubes.

The through-put yield of pure water is 5 m.³/h. The quantity of liquid circulating in both stages is 50 m.³/h. in each instance. The quantity of water recycled from the anion stage to the cation stage is about 15 m.³/h.

The raw water having total content of salt corresponding to 20° German hardness, of which 12° are carbonate hardness, is reduced by the treatment to a quantity which corresponds to an electrical conductivity of 5 mikrosiemens.

Having now described the means by which the objects of the invention are obtained, we claim:

1. A process for the ion exchange treatment of a liquid comprising repeatedly circulating the liquid under treatment and ion exchange material in the same direction within a treating zone providing a cyclic path having an upwardly extending portion and a downwardly extending portion, continuously introducing liquid to be treated and fresh ion exchange material into said treating zone, and continuously withdrawing treated liquid and used ion exchange material from said treating zone in proportion to the quantity of liquid to be treated and fresh ion exchange material introduced thereto, the quantity of liquid and ion exchange material passing through any cross section of said cyclic path per time unit being a multiple of the quantity of treated liquid and used ion exchange material removed from, and untreated liquid and fresh ion exchange material introduced into, said treating zone in the same time unit.

2. A process as in claim 1, said liquid and ion exchange material being circulated by means of the kinetic energy of the liquid to be treated entering the treating zone under pressure.

3. A process as in claim 1, further comprising introducing a gaseous medium into the upwardly extending portion of said cyclic path.

4. A process as in claim 1, said circulating liquid and ion exchange material being subjetced to repeated lateral deflection.

5. A process as in claim 4, said liquid and ion exchange material moving in a helicoidal path during part of their circulation in said treating zone.

6. A process as in claim 1, said liquid under treatment and a plurality of types of ion exchange materials being circulated in said treating zone.

7. A process for the ion exchange treatment of a liquid comprising circulating both a liquid and a cation exchange material in the same direction within a first treatment zone, drawing off a part of the treated liquid and a part of the used cation exchange material, adding untreated liquid and fresh cation exchange material to the circulating liquid and cation exchange material in proportion to the quantity of withdrawn treated liquid and used cation exchange material; circulating a portion of the withdrawn treated liquid with anion exchange material in the same direction within a second treatment zone, drawing off a part of the treated liquid and a part of the used anion exchange material from said second treatment zone, adding liquid treated in said first treatment zone and fresh anion exchange material to the circulating liquid and anion exchange material in said second treatment zone in proportion to the quantity of withdrawn treated liquid and used anion exchange material, and recycling a portion of the treated liquid withdrawn from said second treatment zone back to said first treatment zone.

8. Apparatus for the ion exchange treatment of a liquid comprising a treating chamber providing a cyclic passageway for both liquid undergoing treatment and ion exchange material, said passageway having an upwardly directed portion, and a downwardly directed portion, said portions communicating with one another at their upper and lower ends, inlet means for liquid and ion exchange material into said passageway, outlet means for liquid and ion exchange material from said passageway, means for introducing a conveying gas into the lower part of the upwardly directed portion of said passageway, a liquid-solids separation chamber outside of and connected with said passageway, an outlet for clarified liquid from said liquid-solids separation chamber, means for conveying ion exchange material from said liquid-solids separation chamber to a regeneration chamber, regenerant inlet means for said regeneration chamber, spent regenerant outlet means, and means for introducing rinse liquid into said regeneration chamber and for returning regenerated ion exchange material from said regeneration chamber to said passageway.

9. Apparatus acconding to claim 8, said cyclic passageway comprising concentric tubes.

10. Apparatus according to claim 8, further comprising deflecting elements in said passageway, said elements constituting less than 50 perient of the volume of one of the portions of said passageway.

(References on following page)

References Cited in the file of this patent

UNITED STATES PATENTS

| | | | |
|---|---|---|---|
| 1,186,608 | Rankin | June 13, 1916 |
| 1,480,482 | Wheeler | Jan. 8, 1924 |
| 1,608,661 | Nordell | Nov. 30, 1926 |
| 1,671,864 | Higgins | May 29, 1928 |
| 1,752,339 | Green | Apr. 1, 1930 |
| 2,528,099 | Wilcox et al. | Oct. 31, 1950 |
| 2,744,066 | Spiess | May 1, 1956 |
| 2,762,510 | Gwyn | Sept. 11, 1956 |
| 2,793,753 | Webster | May 28, 1957 |